United States Patent
Masse et al.

(10) Patent No.: US 8,770,844 B2
(45) Date of Patent: Jul. 8, 2014

(54) SELF-LUBRICATING BUSHING FOR A JOINT, WHICH IS INTENDED TO BE MOUNTED ON A SHAFT

(75) Inventors: Emmanuel Masse, Feurs (FR); Patrick Villemagne, Saint Etienne (FR); Eric Chaduiron, Viricelles (FR)

(73) Assignee: H.E.F., Andrezieux Boutheon Cedex (FR)

( * ) Notice: Subject to any disclaimer, the term of this patent is extended or adjusted under 35 U.S.C. 154(b) by 0 days.

(21) Appl. No.: 13/581,530

(22) PCT Filed: Mar. 16, 2011

(86) PCT No.: PCT/FR2011/050530
§ 371 (c)(1),
(2), (4) Date: Nov. 26, 2012

(87) PCT Pub. No.: WO2011/121205
PCT Pub. Date: Oct. 6, 2011

(65) Prior Publication Data
US 2013/0064483 A1    Mar. 14, 2013

(30) Foreign Application Priority Data
Mar. 29, 2010  (FR) ..................................... 10 52296

(51) Int. Cl.
*F16C 33/74* (2006.01)
*F16C 33/20* (2006.01)

(52) U.S. Cl.
CPC .................................. *F16C 33/201* (2013.01); *F16C 33/74* (2013.01)
USPC ............ 384/138; 384/140; 384/142; 384/151

(58) Field of Classification Search
USPC ............. 384/15, 16, 129, 130, 137, 138, 140, 384/142, 147, 148, 151, 275, 276, 286, 322
See application file for complete search history.

(56) References Cited

U.S. PATENT DOCUMENTS

| | | | | |
|---|---|---|---|---|
| 3,330,605 A | * | 7/1967 | Jasmand | 384/16 |
| 3,366,425 A | * | 1/1968 | Genz | 384/16 |
| 3,527,507 A | | 9/1970 | Clark et al. | |
| 5,480,937 A | * | 1/1996 | Yoshihara | 525/66 |

(Continued)

FOREIGN PATENT DOCUMENTS

| | | |
|---|---|---|
| DE | 4310348 A1 | 10/1993 |
| EP | 0050949 A1 | 5/1982 |
| JP | 2009257366 A | 11/2009 |
| WO | 2005072387 A2 | 8/2005 |

OTHER PUBLICATIONS

International Search Report for PCT/FR2011/050530 dated Jun. 1, 2011.

*Primary Examiner* — Phillip A Johnson
(74) *Attorney, Agent, or Firm* — Heslin Rothenberg Farley & Mesiti P.C.

(57) ABSTRACT

This bush is made out of a composite material that has a modulus of elasticity of between 500 and 6000 N/mm2, said bush having at least one lip formed directly at the time of manufacture as an overrun edge of its bore to act as a leak-tight or protective barrier after mounting on the shaft by creating a tightening effect between the inside diameter of said lip or said lips, and the outside diameter of said shaft.

8 Claims, 1 Drawing Sheet

(56) References Cited

U.S. PATENT DOCUMENTS 5,880,043 A * 3/1999 Lorenz et al. .................. 442/94
6,524,979 B1 2/2003 Lorenz et al.
2002/0012482 A1 * 1/2002 Pridgeon ........................ 384/36
2004/0066993 A1 * 4/2004 Mahieux et al. .............. 384/122

* cited by examiner

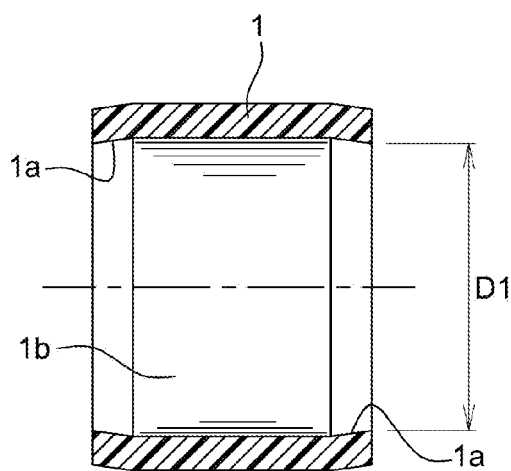
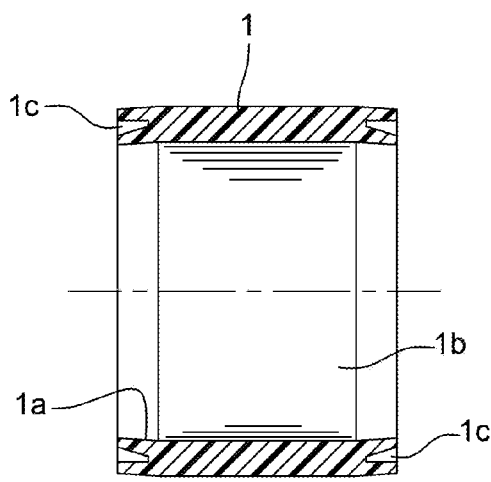
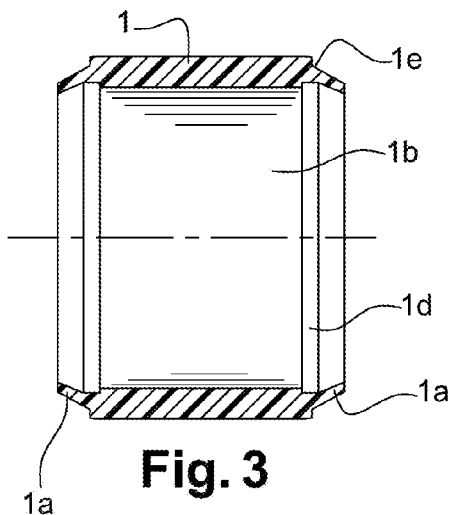
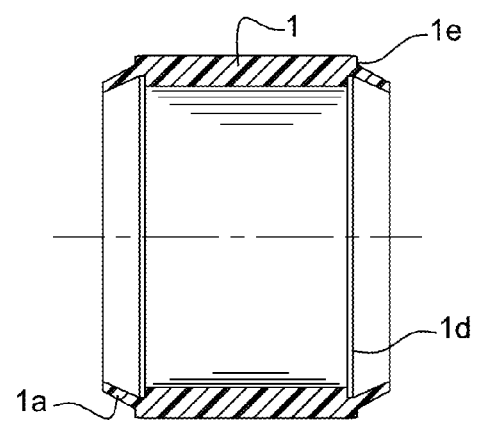
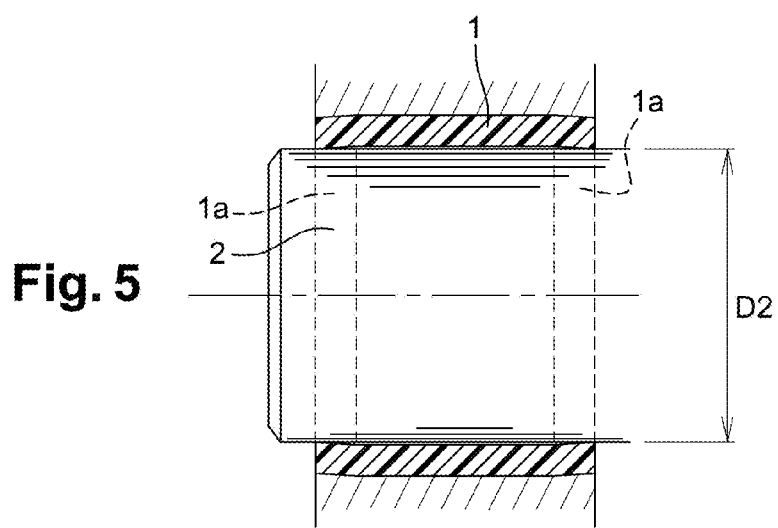

SELF-LUBRICATING BUSHING FOR A JOINT, WHICH IS INTENDED TO BE MOUNTED ON A SHAFT

CROSS REFERENCE TO RELATED APPLICATIONS

This application is a national stage filing under section 371 of International Application No. PCT/FR2011/050530 filed on Mar. 16, 2011, and published in French on Oct. 6, 2011 as WO 2011/121205 A1 and claims priority of French application No. 1052296 filed on Mar. 29, 2010, the entire disclosure of these applications being hereby incorporated herein by reference.

BACKGROUND ART

The invention relates to the technical field of self-lubricating hinge connections, in particular in respect of mounting a shaft in a bushing or bearing, for the purpose of translatory and/or rotational guidance.

The invention is used to advantage in the case of hinge connections that operate in an abrasive medium.

In an abrasive medium, the wear phenomenon may sometimes be highly significant. Said wear may become apparent on the shaft and/or the bushing and is the result of external attack generally at the point of contact of the outside diameter of the shaft with the inside diameter of the bushing or bearing.

In an attempt to resolve this problem, a proposal has been made for the bore of the bushing or bearing under consideration to be fitted with at least one leak-tight protective joint, in order to try to ensure that the hinge connection continues to operate properly in an abrasive medium. More often than not, the body of the bushing is made of metal, whereas the added joint may be made of PU, PA, NBR, etc. For example, the joint may be mounted in a counterbore formed coaxially to the bore of the bushing.

Still with the objective of creating a leak-tight protective barrier against external attack, a bushing solution is clearly stated in the teaching in the document WO 2005/072387 which relates to a bushing fitted with an added joint housed in a counterbore formed at each of the ends of the bore of the bushing. Each joint is shaped to create a leak-tight barrier.

But it has turned out that the fact of adding a joint relative to the bushing, on the one hand, and the fact that the joint is made out of a different material from that of the bushing, on the other hand, present some drawbacks. For example, there may be risks of the joint being dislodged. The fact that the hinge connection is composed of heterogeneous parts, in terms of materials, may generate dimensional variations, further in particular to phenomena of expansion in terms of the differentials between the components, humidity absorption, resumption of tightening etc.

It is also observed that, according to the prior art, a plurality of materials are in contact with the shaft or the conflicting parts, namely the metal in respect of the bushing and the material of the joint. The result is that the wear is not uniform.

Lastly, these added joints generate a not inconsiderable cost given the number of parts required and occasional assembly difficulties.

The set purpose of the invention is to overcome these drawbacks in a straightforward, safe, effective and rational manner.

The problem the invention sets out to resolve is that of providing anti-abrasion protection in the case of a hinge connection against any type of external attack, without the necessity of adding an additional joint, as is apparent in the prior art analysis.

BRIEF SUMMARY OF THE INVENTION

To resolve said problem, a hinge connection bushing has been designed and perfected for mounting on a shaft. Said bushing is made out of a composite material and has at least one lip formed directly at the time of manufacture as an overrun edge of its bore to act as a leak-tight barrier after assembly on the shaft by creating a tightening effect between the inside diameter of said lip or said lips, and the outside diameter of said shaft.

The invention can be used to particular advantage in respect of any type of hinge connection, and particularly of the pivot type, that operates in an abrasive medium.

These characteristics allow a homogenous unit to be obtained given that the lip is cut out of the mass of the bushing.

Advantageous results have been obtained in the case of a composite material which has a modulus of elasticity of between 500 and 6000 N/mm2. Tightening between the inside diameter of the lip and the outside diameter of the shaft is between 0.05 and 4 mm, and preferably 0.2 and 2 mm.

In a preferred embodiment, the composite material is an epoxy or vinylester or polyester resin. The epoxy or vinylester or polyester resin incorporates reinforcements in the form of thermoplastic fibres with a thickness of between 0.05 and 0.5 mm and including lubricating fillers between 5 and 50% of the volume.

Starting with the characteristics underlying the invention, different embodiments are conceivable, particularly in terms of the lip or lips.

Thus:
  Either, the lip is formed at one of the ends at least of the bore of the bushing.
  Or, the lip is formed starting from an internal groove provided in the bore of the bushing.
  Or, the lip is formed directly starting from the bore of the bushing.
  Or, the lip defines, with the periphery of the body of the bushing, a circular cut-out.
  Or, the lip defines, with the periphery of the body of the bushing, a shoulder.

BRIEF DESCRIPTION OF THE DRAWING FIGURES

The invention is disclosed hereinafter in further detail with the help of the figures in the appended drawings wherein:

FIGS. 1, 2, 3 and 4 are longitudinal cross-section views showing a plurality of examples of embodiments of a hinge connection bushing in accordance with the inventive characteristics;

FIG. 5 is a diagrammatic cross-section view of a hinge connection fitted with a self-lubricating bushing according to the invention.

DETAILED DESCRIPTION

According to the invention, the bushing or bearing, denoted in its entirety as (1), is made out of a composite material and has at least one lip (1a) formed directly when it is manufactured. The composite material, constituting the body of the bushing, has a modulus of elasticity of between 500 and 6000 N/mm2. This composite material is an epoxy or vinylester or polyester resin reinforced by thermoplastic fibres with a thickness of between 0.05 mm and 0.5 mm, and including lubricating fillers between 5 and 50% of the volume.

The bushing may be made by moulding and/or machining.

The lip or lips (1a) are an overrun edge in the bore (1b) of the bushing to act as a leak-tight and/or protective barrier after assembly, on a shaft (2) or the like, by creating a tightening effect between the inside diameter (D1) of the bushing and the outside diameter (D2) of the shaft (2).

The tightening between the diameter (D1) and the diameter (D2) is between 0.05 and about 4 mm and, to advantage, between 0.2 and 2 mm.

As is shown particularly by FIGS. 1 to 4, a lip (1a) is formed at each of the ends of the bushing (1). It is quite clear that, without however departing from the context of the invention, the number and arrangement of the lips are not to be considered as being restrictive.

In FIG. 1, each of the lips (1a) is formed directly starting from the bore (1b).

The same thing is true as regards FIG. 2, except that each of the lips (1a) defines, with the periphery of the body of the bushing (1), a circular cut-out (1c), in order to promote the elasticity of the lip under consideration.

In FIGS. 3 and 4, each of the lips is formed starting from an internal groove (1d) provided in the bore (1b). The width of this groove may be variable. Still in FIGS. 3 and 4, each lip (1a) defines, with the periphery of the body of the bushing (1), a shoulder (1e).

Wear tests on bushings made out of a composite material, in accordance with the inventive characteristics, have been carried out in comparison particularly with bushings fitted with added joints, and as a reference relative to a bushing that has no joint. These tests were carried out on a back-and-forth movement friction simulator for a maximum duration of one month.

The test conditions were as follows:
Pressure: 40 MPa.
Speed: 15 m/s.
PV: 0.6 MPa.m/s.
Oscillation: +/−100°.
Maximum test duration: 1 month.
Maximum allowable wear: 0.5 mm.
Tests carried out with 50 μm sand in contact with the shaft/bearing connection.
Initial diameter of tempered case-hardened 16NC6 shaft: 30 mm.
Initial clearance: 2 mm.

With the reference bushing, in other words with no leak-tight joint, at the end of about 300,000 cycles, the maximum permitted wear (0.5 mm) is reached.

With a bushing made of metal fitted at the front with a CSWM30 joint made of PA, with a lip of diameter 29.41 mm, at the end of 300,000 cycles, the maximum permitted wear (0.5 mm) is reached.

With a bushing made of a composite material in accordance with the inventive characteristics, in other words with integrated lip, with a diameter of 29.2 mm and a tightening of 0.78 mm, at the end of 700,000 cycles, the wear reading is 0.2 mm.

For each of the bushings tested, the wear is deduced from a daily reading on comparators placed on each simulation bench.

The advantages are clear from the description, and in particular the following are stressed and restated:

- the nature of the composite material of the bushing conferring a self-lubricating function thereon, in combination with the lip or lips in order to provide effective protection against all kinds of external attack;
- making the bushing to include one or more lips provides a cost saving at assembly and during maintenance;
- the homogeneity of the material;
- the elasticity of the material allows deformation on loading, and then a return to the initial state without the load;
- the improvement in service life;
- the lack of any metal parts renders the bushing compatible with some media (liquid, gaseous) or with magnetic environments such as, for example, those encountered in the field of medical instrumentation;
- no relative expansion, given that deformation due to heat is the same at all points on the bushing;
- the limitation of noise pollution;
- the possibility of making one or more grooves that facilitate and improve the elasticity of the lip or lips.

The invention claimed is:

1. Self-lubricating hinge connection bushing for mounting on a shaft for translational and/or rotational guidance, comprising a composite material having a modulus of elasticity of between 500 and 6000 N/mm2 allowing deformation upon application of a load and then a return to an initial state upon load removal, wherein the composite material comprises an epoxy or vinylester or polyester resin incorporating reinforcements of thermoplastic fibers with a thickness of between 0.05 and 0.5 mm and including lubricating fillers between 5 and 50% by volume, said bushing having at least one lip formed directly at a time of manufacture as an overrun edge of a bore of a body of the bushing to act as a leak-tight or protective barrier after mounting on the shaft by creating a tightening effect between an inside diameter of said at least one lip, and an outside diameter of said shaft, wherein the tightening between the inside diameter of the at least one lip and the outside diameter of the shaft is between 0.05 and 4 mm.

2. Bushing as claimed in claim 1, wherein the tightening between the inside diameter of the at least one lip and the outside diameter of the shaft is between 0.2 and 2 mm.

3. Bushing as claimed in claim 1, wherein the at least one lip is formed at at least one end of the bore.

4. Bushing as claimed in claim 1, wherein the at least one lip is formed starting from an internal groove extending radially from the bore into the body of the bushing.

5. Bushing as claimed in claim 1, wherein the at least one lip is formed directly starting from the bore.

6. Bushing as claimed in claim 1, wherein the at least one lip defines, with a periphery of the body of the bushing, a circular cut-out.

7. Bushing as claimed in claim 1, wherein the at least one lip extends axially outward beyond the body of the bushing and defines a shoulder of reducing radial extent with a periphery of the body of the bushing.

8. Bushing as claimed in claim 1, wherein radial thickness of the lip and radial thickness of the body of the bushing are equal.

* * * * *